UNITED STATES PATENT OFFICE.

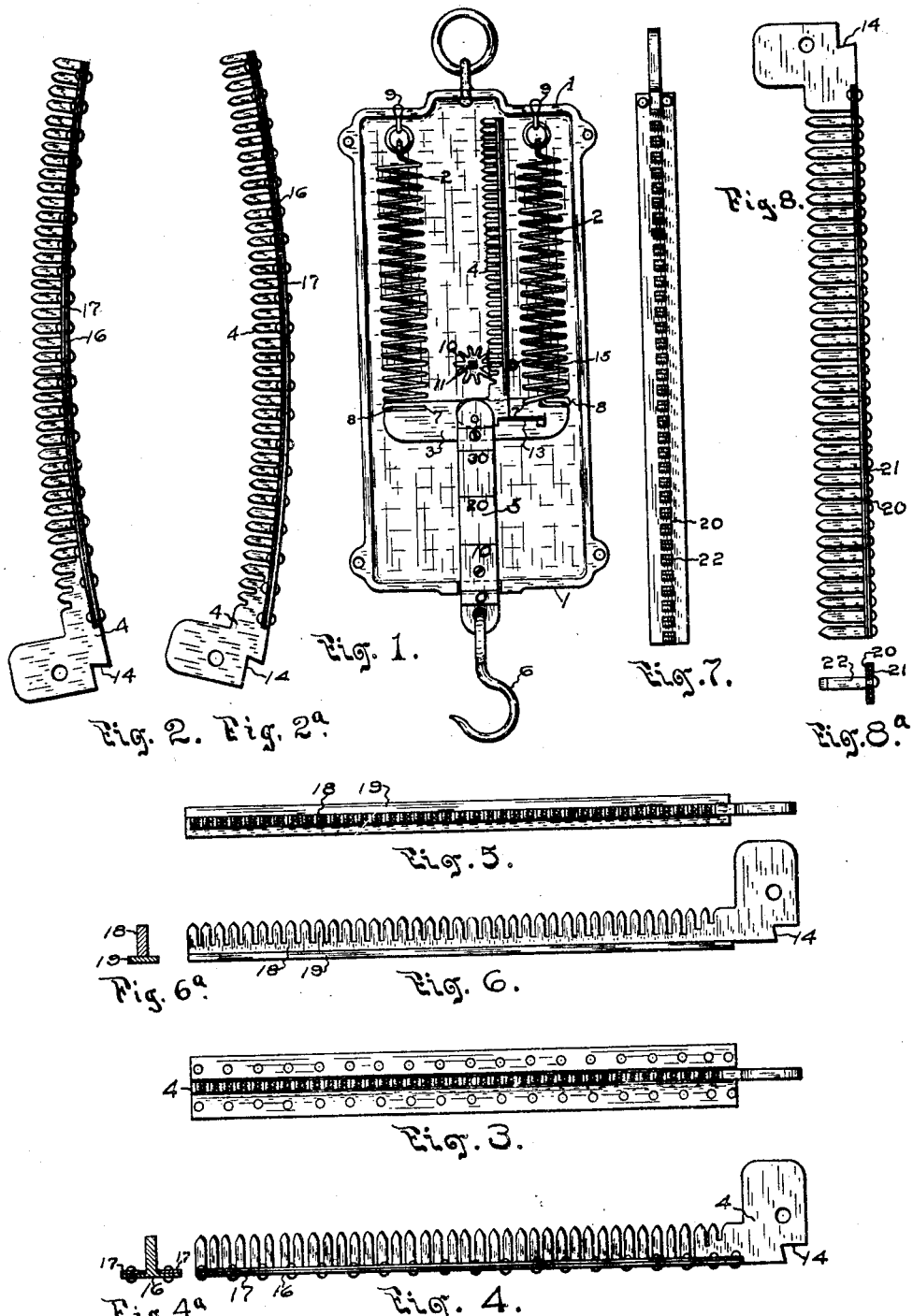

JOHN H. SWIHART, OF ELYRIA, OHIO.

COMPENSATING DEVICE FOR SCALES.

No. 807,694.    Specification of Letters Patent.    Patented Dec. 19, 1905.

Application filed April 14, 1902. Serial No. 102,737.

*To all whom it may concern:*

Be it known that I, JOHN H. SWIHART, a citizen of the United States, residing at Elyria, in the county of Lorain and State of Ohio, have invented new and useful Improvements in Compensating Devices for Scales, of which the following is a specification.

This invention relates in general to weighing devices, and has particular reference to the means employed for securing accurate indications or readings on spring-scales regardless of the variation of the temperature of the room in which the scale is placed.

As is well known, an increase of temperature expands or lengthens and weakens the springs in scales, thus making them more flexible, with the result that an object of a given weight will give a higher indication on such a scale than it would if the temperature were lower. Various means may be employed for effecting the necessary correction of readings automatically, some of which are shown in the accompanying drawings, in which—

Figure 1 represents the weighing parts of a spring-balance scale having one form of my compensating device applied thereto, the dial, the index-finger, and the front plate being removed to show the arrangement of the interior parts. Fig. 2 shows in side elevation a form of rack that I prefer to use with this form of device, said figure indicating the rack expanded so as to increase the length of its pitch-line. Fig. 2$^a$ is a view similar to Fig. 2, showing the rack bent in the opposite direction, due to contraction of the parts at a lower temperature. Fig. 3 is a front elevation of the rack shown in Fig. 2. Fig. 4 is a side elevation of this rack, showing the same at normal temperature. Fig. 4$^a$ is a transverse sectional view taken through Fig. 4 near the left end thereof. Figs. 5, 6, 6$^a$, 7, 8, and 8$^a$ illustrate other forms of racks that may be employed instead of that shown in Figs. 2 to 4, inclusive, Figs. 6$^a$ and 8$^a$ being sectional views taken through the racks shown in Figs. 6 and 8 near their smaller ends.

In view of the fact that the accuracy with which spring-balance scales weigh varies with the temperature to which they are subjected it is customary for scale manufacturers to so adjust the springs and rack that the scales weigh accurately at a temperature of about 70° Fahrenheit, this being about the temperature to which the greater number of scales are likely to be subject in use. With a scale so adjusted, however, when the temperature falls considerably below 70° the effect of the cold is to give the springs greater resistance, either by shortening them or increasing their resisting power. Conversely, when the temperature rises above 70° the springs are weakened in resisting power and the scale "gains" in weight indication, so that a less weight of any substance will be required to indicate a given weight on the index or dial of the scale than would be required at 70°. In the drawings, in which similar reference characters designate corresponding parts throughout the several views, I have shown one form of device for compensating for these differences in the springs and for causing the scales to give accurate indications regardless of the temperatures. Personally I regard 70° Fahrenheit as too high a temperature for the average, and I therefore adjust my scales at a temperature of 62° Fahrenheit.

In the drawings, 1 represents the casing of the scale, within which are the springs 2 2. To the lower end of these springs is secured the runner 3, to which is pivoted the lower end of the rack 4 and the upper end of the pendent bar 5, that carries the hook or other attaching means 6. The springs are preferably secured to the runner by inserting their lower ends through holes 7 7 in the runner and then continuing them through slits 8 8 in the ends thereof, after which they are held by bending down those portions of the runner above the slits to make them grip the springs. Before carrying out this last operation, however, the scale is adjusted to weigh accurately at the normal temperature, which adjustment can readily be made by drawing the springs through the holes 7 7 a greater or less amount, as required. In order to readily permit this adjustment, the springs are suspended from swivel hooks or rings 9 9 in the upper part of the casing, so that they can be turned axially.

10 is the pinion for turning the shaft 11, upon which is mounted the dial-hand. (Not shown.) The teeth of the rack 4 engage with this pinion and turn the same with the dial-hand as the rack moves up and down. The rack is pivoted to the runner at a point directly below the shaft 11 and is held in mesh with the pinion by means of a spring 13, that engages with a shoulder 14 at the lower and rear edge of the rack. A stationary pin or stud 15 also engages with the rear edge of the rack just back of the pinion to assist in holding these parts in mesh.

The racks 4 (shown in Figs. 1 to 4) are made of two metals having different coefficients of expansion and joined together in such a way that the entire rack warps with the changes in temperature. The back of the rack and the teeth are made of one piece of material, as shown at 16 in the sectional view of Fig. 4. Preferably this piece has a very low coefficient of expansion, and for this reason I use nickel-steel or nickel-iron, the expansibility of which is practically *nil*. The back of the rack is a flat plate that projects outwardly from the teeth, and on the front of this back at each side of the teeth are secured strips of metal 17, that have a relatively high coefficient of expansion. While any suitable metal may be employed and while they may be secured to the back 16 in any suitable manner, I prefer to use zinc and to secure the strips by means of rivets placed close together, as shown. As will be noticed, the teeth of the rack are made of considerable length, and the pitch-line is near their outer ends, so that when the rack warps, as shown in Fig. 2, the pitch-line varies in length. On the left-hand side of that figure the pitch-line is lengthened, because the temperature has risen above 62° and the zinc strips 17 have expanded. Conversely, on the right-hand side the pitch-line has shortened, because the temperature is below 62° and the zinc has contracted.

From this description it will be seen that when the springs 2 weaken with a rise in temperature the pitch-line lengthens correspondingly and that while the rack travels farther with a given weight it is longer at the pitch-line and must needs travel farther in order to give a correct reading. Thus the changes in temperature cause the pitch-line of the rack to vary and compensate for the changes in rack travel due to the variations of the spring, and the rack thus becomes a thermo-expansion regulator.

In the form of rack just described the teeth are cut in the least expansible metal—the nickel-steel or nickel-iron. In Figs. 5 and 6 I show a form in which the teeth are cut in the most expansible metal 18 and extend only part way to the backing 19, which consists of a plate of metal of a low coefficient of expansion, such as nickel-steel. Preferably the part 18 is made of brass, and its thickness below the roots of the teeth is substantially equal to the thickness of the metal 19. This form of rack is not so sensitive as that first described, the brass not being so expansible as the zinc.

In Figs. 7 and 8 I illustrate a still different form of rack, in which the strips 20 and 21 are preferably made of zinc and nickel-steel, respectively, and are held together by the teeth 22, that are passed through the same and riveted, as shown. As these pin-teeth are separated and can be made of any length practicable, and the variation of the pitch-line depends upon the length of the teeth, the sensitiveness of the device can be materially increased or diminished by employing this form of rack and varying the length of teeth thereon.

Having thus described my invention, what I claim as new, and desire to secure by Letters Patent, is—

1. In a weighing device, a pinion, and a thermo-expansion rack for moving the pinion, the pitch-line of said rack varying with the changes in its temperature, substantially as described.

2. In a thermo-expansion regulator, a pinion, a rack for turning said pinion, said rack being composed of a plurality of pieces of different metals that are so associated together as to cause the pitch-line to be a straight line at one temperature, a convex line at a higher temperature, and a concave line at a lower temperature.

3. In a spring-scale, a pinion, a rack engaging with said pinion and being composed of two layers of metal, the metal of each layer having a coefficient of thermo-expansion different from that of the other metal, and having the teeth cut in one of the layers only.

4. In a spring-scale, a pinion, a rack engaging with said pinion and being composed of two layers of metal of different coefficients of expansion secured together to form a thermo-expansion bar, and having its teeth cut in the less expansible metal.

5. In a spring-scale, the combination with the springs, the runner connecting the same, and means for suspending substances for weighing from the runner, a pinion, and a rack-bar attached to the runner for turning the pinion, said rack-bar being composed of two layers of metal of different coefficients of expansion, the layers being secured together to form a thermo-expansion bar, and having the teeth cut in one of the layers only.

6. In a spring-scale, a pinion, a rack engaging with said pinion and having the elongation or contraction of the pitch-line abnormally increased by forming the rack of two layers of metal of different coefficients of expansion secured together and having the teeth cut in one of the metals only.

7. In a spring-scale, a pinion, a rack having the back and teeth composed of a metal having a low coefficient of thermo-expansion, and strips of zinc secured to the back on opposite sides of the teeth.

8. In a spring-scale, the combination with the springs, the runner connecting the same, and means for suspending substances for weighing from the runner, a pinion, and a rack-bar attached to the runner for turning the pinion, said rack-bar having the back and teeth composed of a metal having a low coefficient of thermo-expansion and strips of zinc secured to the back on opposite sides of the teeth.

9. In a weighing device, a pinion, and a rack for turning the pinion, said rack having the back and teeth composed of a metal having a low coefficient of thermo-expansion, and strips of zinc secured to the back on opposite sides of the teeth, for the purpose specified.

In testimony whereof I affix my signature in the presence of two witnesses.

JOHN H. SWIHART.

Witnesses:
S. E. Fouts,
James T. Harding.